United States Patent
Cheng et al.

(10) Patent No.: US 10,298,653 B1
(45) Date of Patent: May 21, 2019

(54) METHODS FOR MONITORING STREAMING VIDEO CONTENT QUALITY OF EXPERIENCE (QOE) AND DEVICES THEREOF

(71) Applicant: F5 Networks, Inc., Seattle, WA (US)

(72) Inventors: Liang Cheng, San Jose, CA (US); Sumandra Majee, San Jose, CA (US); Saxon Amdahl, Portola Valley, CA (US)

(73) Assignee: F5 Networks, Inc., Seattle, WA (US)

(*) Notice: Subject to any disclaimer, the term of this patent is extended or adjusted under 35 U.S.C. 154(b) by 505 days.

(21) Appl. No.: 14/939,710

(22) Filed: Nov. 12, 2015

Related U.S. Application Data

(60) Provisional application No. 62/078,824, filed on Nov. 12, 2014.

(51) Int. Cl.
H04L 29/06 (2006.01)

(52) U.S. Cl.
CPC .......... *H04L 65/80* (2013.01); *H04L 65/4069* (2013.01)

(58) Field of Classification Search
CPC ............................ H04L 65/80; H04L 65/4069
See application file for complete search history.

(56) References Cited

U.S. PATENT DOCUMENTS

| | | | |
|---|---|---|---|
| 9,479,562 B2 | 10/2016 | Funge et al. | |
| 2012/0311126 A1* | 12/2012 | Jadallah | H04L 41/5067 709/224 |
| 2013/0263167 A1* | 10/2013 | Parthasarathy | H04L 41/5067 725/14 |
| 2015/0026309 A1 | 6/2015 | Radcliffe et al. | |
| 2015/0256600 A1* | 9/2015 | Dakhane | H04L 67/10 709/203 |
| 2015/0365452 A1 | 12/2015 | Assem Aly Salama et al. | |
| 2015/0381755 A1* | 12/2015 | Li | H04L 67/2842 709/214 |
| 2017/0085950 A1 | 3/2017 | Halepovic | |
| 2017/0093648 A1 | 3/2017 | ElArabawy et al. | |

(Continued)

OTHER PUBLICATIONS

F5 Networks Inc., Big-IP® Acceleration: Implementations, Sep. 25, 2013, Manual, version 11.4.1, p. 1-176.*

(Continued)

*Primary Examiner* — Wing F Chan
*Assistant Examiner* — Billy H Ng
(74) *Attorney, Agent, or Firm* — Pepper Hamilton LLP

(57) ABSTRACT

A method, non-transitory computer readable medium, and application management computing device that obtains a segment of streaming video content from a server device in response to a request for the segment received from a client device. One or more static or dynamic parameter values associated with the streaming video content are determined. A segment quality of experience (QOE) score is generated for the segment based on one or more of the static or dynamic parameter values. A session identifier is extracted from the request or from a response from the server device that includes the segment. A video QOE score is generated for the streaming video content based on the segment QOE score and another segment QOE score for another segment of the streaming video content retrieved from a record of a session database associated with the session identifier. The video QOE score is output.

20 Claims, 5 Drawing Sheets

(56) References Cited

U.S. PATENT DOCUMENTS

2017/0142450 A1    5/2017    Ghosal et al.
2017/0195242 A1    6/2017    Ibrahim

OTHER PUBLICATIONS

F5 Networks, Inc., "BIG-IP® Acceleration: Implementations", F5 Networks, Inc., Version 11.5, Jan. 27, 2014, pp. 1-172, Part-One.
F5 Networks, Inc., "BIG-IP® Policy Enforcement Manager™: Implementations", F5 Networks, Inc., Version 11.5, Sep. 26, 2014, pp. 1-122.
F5 Networks, Inc., "BIG-IP® Policy Enforcement Manager™: Implementations", Manual, Sep. 16, 2013, pp. 1-98, version 11.4.1, F5 Networks Inc.
F5 Networks Inc., "BIG-IP® Acceleration: Implementations", Manual, Sep. 25, 2013, pp. 1-176, version 11.4.1, F5 Networks Inc.
F5 Networks, Inc., "Release Notes: BIG-IP AAM 11.4.1", May 20, 2014, pp. 1-13, version 11.4.1, F5 Networks Inc.
F5 Networks, Inc., "Release Notes: BIG-IP PEM 11.4.1", Manual, May 21, 2014, pp. 1-5, version 11.4.1, F5 Networks Inc.
F5 Networks, Inc., "BIG-IP® Acceleration: Concepts", Manual, Nov. 14, 2014, pp. 1-172, version 11.4.1, F5 Networks Inc.
F5 Networks, Inc., "F5 TMOS Operations Guide", Manual, Nov. 9, 2015, pp. 1-279, F5 Networks Inc.

\* cited by examiner

| Session Database 32 | | | | |
|---|---|---|---|---|
| Session ID | Segment Number | Static Parameters | Dynamic Parameters | QOE Score |
| Session(1) | Seg(1) | | | |
| | ... | | | |
| | Seg(n) | | | |
| ... | | | | |
| Session(n) | Seg(1) | | | |
| | ... | | | |
| | Seg(n) | | | |

FIG. 4

METHODS FOR MONITORING STREAMING VIDEO CONTENT QUALITY OF EXPERIENCE (QOE) AND DEVICES THEREOF

This application claims the benefit of U.S. Provisional Patent Application Ser. No. 62/078,824, filed on Nov. 12, 2014, which is hereby incorporated by reference in its entirety.

FIELD

This technology relates to methods and devices for analyzing quality of experience for consumers of streaming video.

BACKGROUND

Application management computing devices can accelerate and optimize network traffic communicated between server devices and client devices in order to improve the user experience. Application management computing devices can also perform other functions on network traffic, such as load balancing the network traffic to server devices and/or implementing firewalls or other security functionality for the network, for example.

Network traffic handled by application management computing devices includes an increasing amount of streaming video content of various types including HyperText Transfer Protocol (HTTP) Live Streaming (HLS), Dynamic Adaptive Streaming over HTTP (DASH), or Adaptive Bitrate Streaming (ABS), for example. Video segments for streaming video content are generally retrieved using hierarchically structured playlists, whereby a master playlist file stores network addresses of a secondary playlist file which stores network addresses of the video segments. A master playlist file can include network addresses of a plurality of secondary playlist files, each associated with a different bit rate.

Accordingly, upon receipt of the master playlist file, an application, such as a video player executing on a client device, can decide which bit rate is currently most appropriate, or is likely to result in an optimal experience for the user, and request one of the secondary playlist files using the corresponding network address indicated in the master playlist file. Over time, and depending on network characteristics or observations, the application may request various video segments corresponding to different bit rates from several of the secondary playlist files using the corresponding network addresses of the segments indicated in the secondary playlist files.

Hosts or providers of such streaming video content are often interested in the quality of experience (QOE) for users or viewers of the content so that changes can be made to improve poor QOE. Currently, methods for scoring QOE are relatively ineffective, qualitative, and therefore relatively inaccurate. Additionally, current methods for QOE scoring generally require user interaction, such as through surveys or questionnaires.

While some QOE scoring methods have been developed for traditional progressive video streaming that do not require user interaction, these methods are not effective for certain types of streaming video content. For example, these methods have reduced effectiveness for content of the HLS type because multiple connections may be used by a client device to obtain a plurality of segments for a video. In these types of streaming video content, insufficient data is available on a per-connection basis to generate an effective or accurate QOE score for the video.

SUMMARY

A method for optimizing streaming video quality of experience analysis, executable by one or more application management computing devices with at least one processor executing the method, the method including steps to obtain, by a first processor on the one or more application management computing devices, a segment of streaming video content from a server device in response to a request for the segment received from a client device. One or more static or dynamic parameter values associated with the streaming video content are determined by a second processor on the one or more application management computing devices. A segment quality of experience (QOE) score is generated for the segment, by a third processor on the one or more application management computing devices, based on one or more of the static or dynamic parameter values. A session identifier is extracted, by a fourth processor on the one or more application management computing devices, from the request or a response from the server device that includes the segment. A video QOE score is generated and output, by a fifth processor on the one or more application management computing devices, for the streaming video content based on the segment QOE score and another segment QOE score for another segment of the streaming video content retrieved from a record of a session database associated with the session identifier.

A non-transitory computer readable medium having stored thereon instructions for optimizing streaming video quality of experience analysis including executable code, which when executed by one or more processors, causes the processors to perform steps including obtaining a segment of streaming video content from a server device in response to a request for the segment received from a client device. One or more static or dynamic parameter values associated with the streaming video content are determined by a second processor on the one or more application management computing devices. A segment QOE score is generated for the segment, by a third processor on the one or more application management computing devices, based on one or more of the static or dynamic parameter values. A session identifier is extracted, by a fourth processor on the one or more application management computing devices, from the request or a response from the server device that includes the segment. A video QOE score is generated and output for the streaming video content based on the segment QOE score and another segment QOE score for another segment of the streaming video content retrieved from a record of a session database associated with the session identifier.

One or more application management computing devices, including memory comprising programmed instructions stored in the memory and one or more processor configured to be capable of executing the programmed instructions stored in the memory to obtain a segment of streaming video content from a server device in response to a request for the segment received from a client device. One or more static or dynamic parameter values associated with the streaming video content are determined by a second processor on the one or more application management computing devices. A segment QOE score is generated for the segment, by a third processor on the one or more application management computing devices, based on one or more of the static or dynamic parameter values. A session identifier is extracted, by a fourth processor on the one or more application management computing devices, from the request or a response from the server device that includes the segment. A video QOE score is generated and output for the streaming video content based on the segment QOE score and another segment QOE score for another segment of the streaming video content retrieved from a record of a session database associated with the session identifier.

A method for optimizing streaming video quality of experience analysis includes obtaining, by an application management computing device, a segment of streaming video content from a server device in response to a request for the segment received from a client device. One or more static or dynamic parameter values associated with the streaming video content are determined by the application management computing device. A segment QOE score is generated for the segment, by the application management computing device, based on one or more of the static or dynamic parameter values. A session identifier is extracted, by the application management computing device, from the request or a response from the server device that includes the segment. A video QOE score is generated and output, by the application management computing device, for the streaming video content based on the segment QOE score and another segment QOE score for another segment of the streaming video content retrieved from a record of a session database associated with the session identifier.

This technology has a number of associated advantages including providing methods, non-transitory computer readable media and application management computing devices that more effectively analyze QOE for streaming video content. With this technology, persistence can be maintained across connections with a client via which multiple different segments of a streaming video may be obtained. Accordingly, QOE can be determined based on static and dynamic parameter values for an increased number of segments for a same streaming video, resulting in a more effective QOE score for the streaming video content.

BRIEF DESCRIPTION OF THE DRAWINGS

FIG. 4 is an exemplary session database that facilitates maintaining persistency across connections with a client device.

DETAILED DESCRIPTION

Figure 1:
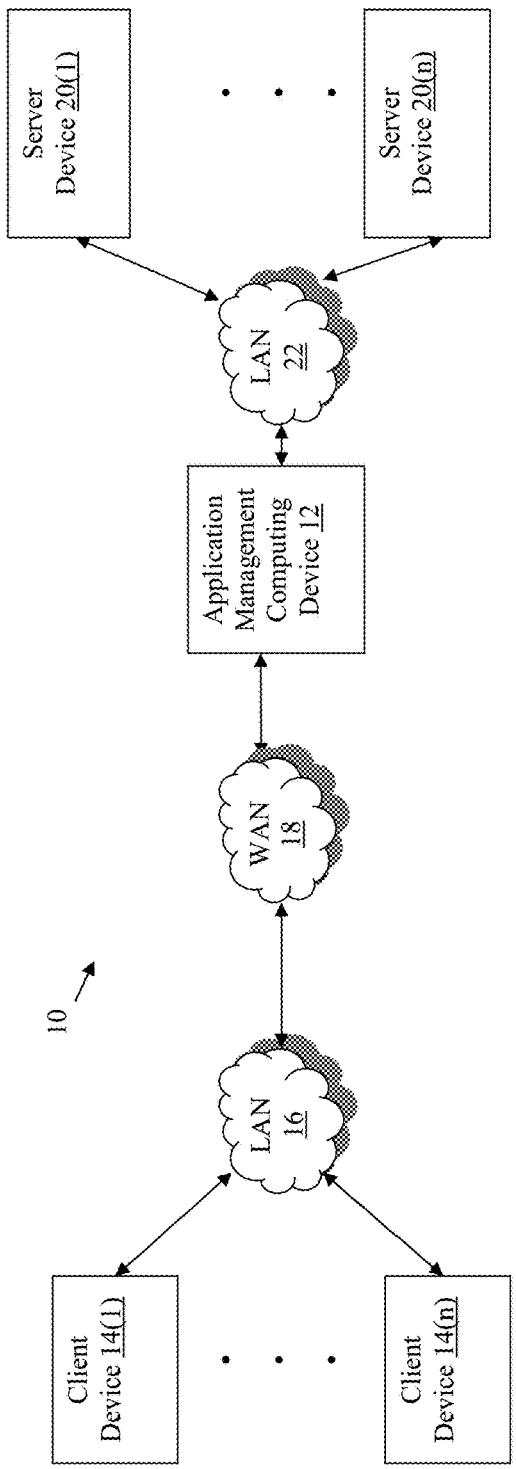
FIG. 1 a block diagram of a network environment with an exemplary application management computing device.

Referring to FIG. 1, a block diagram of an exemplary network environment 10 including an exemplary application management computing device 12 is illustrated. In this example, the application management computing device 12 is coupled to a plurality of client devices 14(1)-14(n) through a local area network (LAN) 16 and a wide area network (WAN) 18 and a plurality of server devices 20(1)-20(n) through another LAN 22, although the application management computing device 12, client devices 14(1)-14(n), and server devices 20(1)-20(n) may be coupled together via other topologies. The network environment 10 may include other network devices such as one or more routers and/or switches, for example, that are well known in the art and will not therefore be described herein. This technology provides a number of advantages including methods, non-transitory computer readable media, and devices that facilitate improved quality of experience (QOE) analysis for streaming video across various connections associated with a user session.

Figure 2:
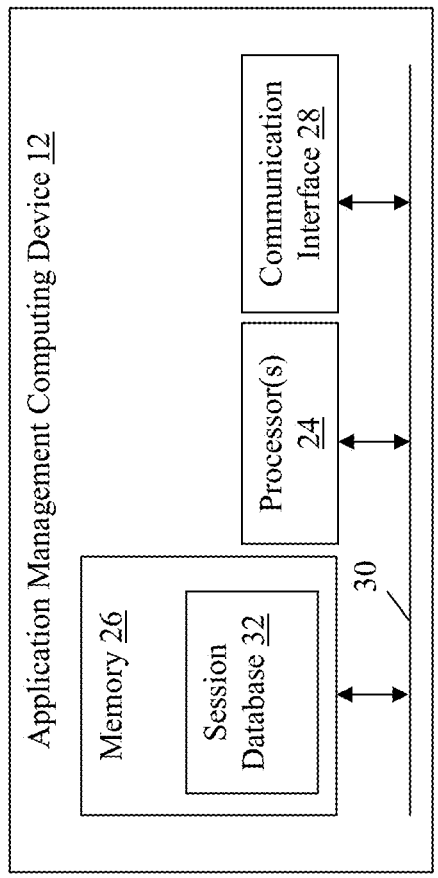
FIG. 2 is a block diagram of the exemplary application management computing device shown in FIG. 1.

Referring to FIGS. 1-2, the application management computing device 12 may perform any number of functions in addition to QOE analysis, such as optionally optimizing, securing, and/or load balancing the network traffic exchanged between the client devices 14(1)-14(n) and the server devices 20(1)-20(n), for example. In this particular example, the application management computing device 12 includes a processor(s) 24, a memory 26, and a communication interface 28 which are coupled together by a bus 30 or other communication link, although the application management computing device 12 may include other types and numbers of elements in other configurations.

The processor(s) 24 of the application management computing device 12 may execute programmed instructions for any number of the functions identified above and/or described herein for analyzing QOE for streaming video content and, optionally, managing network traffic and/or optimizing service of content requests, for example. The processor(s) 24 of the application management computing device 12 may include one or more central processing units and/or general purpose processors with one or more processing cores, for example.

The memory 26 of the application management computing device 12 stores these programmed instructions for one or more aspects of the present technology as described and illustrated herein, although some or all of the programmed instructions could be stored and executed elsewhere. A variety of different types of memory storage devices, such as random access memory (RAM), read only memory (ROM), hard disk drives, solid state drives, or other computer readable media which is read from and written to by a magnetic, optical, or other reading and writing system that is coupled to the processor(s) 24, can be used for the memory 26.

In this example, the memory 26 further includes a session database 32. The session database 32 is used by the application management computing device 12 to maintain persistency across a plurality of connections associated with a session to facilitate more effective QOE monitoring and analysis, as described and illustrated in more detail later.

The communication interface 28 operatively couples and communicates between the application management computing device 12, client devices 14(1)-14(n), and server devices 20(1)-20(n), which are all coupled together by the LANs 16 and 22 and WAN 18, although other types and numbers of communication networks or systems with other types and numbers of connections and configurations to other devices and elements. By way of example only, the LANs 16 and 22 and WAN 18 can use TCP/IP over Ethernet and industry-standard protocols, including NFS, CIFS, SOAP, XML, LDAP, and SNMP, although other types and numbers of communication networks, can be used.

The LANs 16 and 22 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The WAN 18 may comprise any wide area network (e.g., Internet), although any other type of traffic network topology may be used.

Each of the client devices 14(1)-14(n) and server devices 20(1)-20(n) includes a processor, a memory, and a communication interface, which are coupled together by a bus or other communication link, although other numbers and types of network devices could be used. Each of the client devices 14(1)-14(n) may further include an input device or a display device and may run interface applications, such as Web browsers or video player applications or plug-ins, that may provide an interface to make requests for and receive content including streaming video content hosted by the server devices 20(1)-20(n) via the LANs 16 and 22 and/or WAN 18.

The server devices 20(1)-20(n) may provide content, including streaming video content, or other network resources in response to requests directed toward applications hosted by the server devices 20(1)-20(n) from the client devices 14(1)-14(n) via the LANs 16 and 22 and/or the WAN 18 according to the HTTP-based application RFC protocol or the CIFS or NFS protocol, for example. The server devices 20(1)-20(n) may be hardware or software or may represent a system with multiple server devices in a server device pool, which may include internal or external networks. Various network processing applications, such as CIFS applications, NFS applications, HTTP Web Server device applications, and/or FTP applications, may be operating on the server devices and transmitting data (e.g., media content, video segments, files, and/or web pages) in response to requests from the client devices 14(1)-14(n).

Although the exemplary network environment 10 with the application management computing device 12, client devices 14(1)-14(n), server devices 20(1)-20(n), LANs 16 and 22, and WAN 18 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 3:
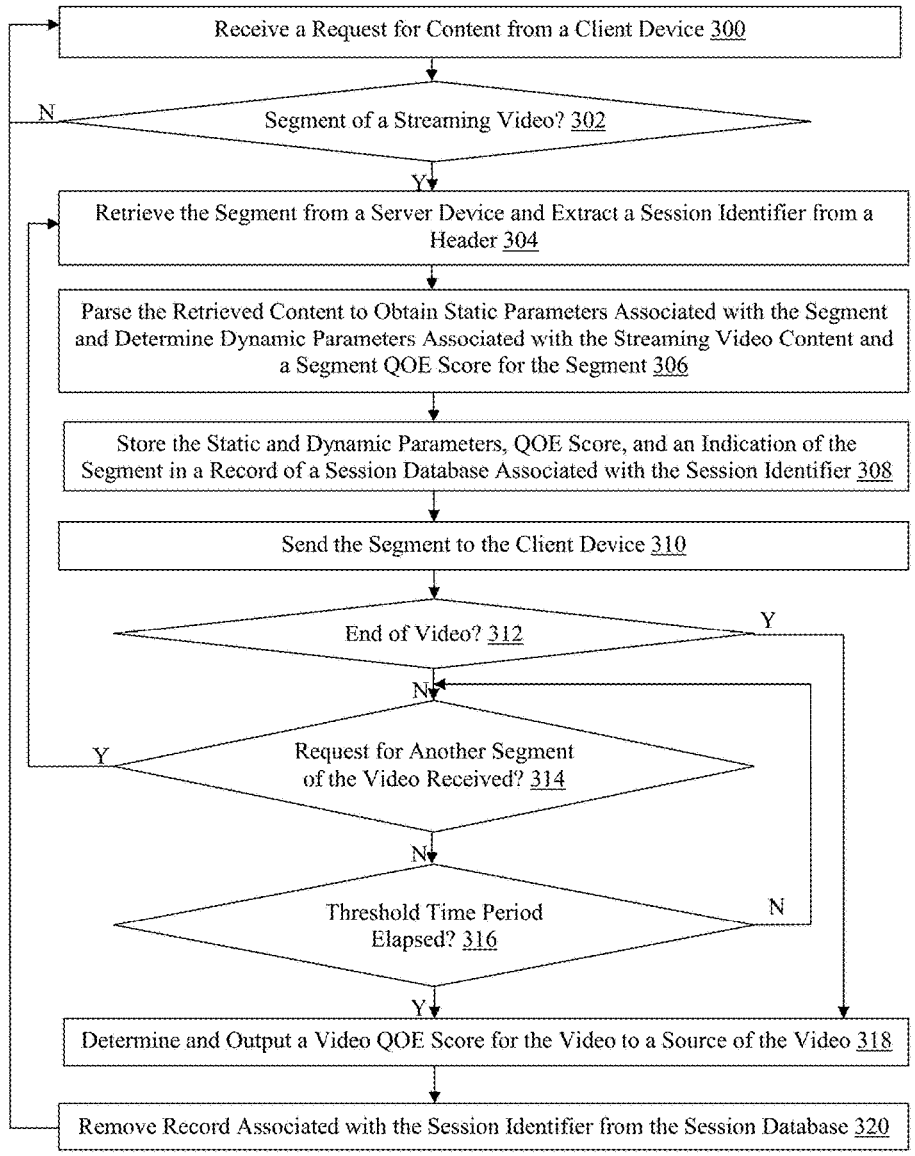
FIG. 3 is a flowchart of an exemplary method for analyzing a quality of experience (QOE) for a streaming video across connections with a client device.

Exemplary methods for monitoring streaming video content quality of experience (QOE) will now be described with reference to FIGS. 1-5. Referring more specifically to FIG. 3, a method for analyzing a QOE for a streaming video across connections with one of the client devices 14(1)-14(n) is illustrated. In step 300 in this example, the application management computing device 12 receives a request for content from one of the client devices 14(1)-14(n) via the LAN 16 and the WAN 18. The request can be an HTTP request for content stored by one of the server devices 20(1)-20(n), for example.

In step 302, the application management computing device 12 determines whether the requested content is a segment of streaming video. For example, the application management computing device 12 can determine whether the request is for a segment of content having a type comprising HyperText Transfer Protocol (HTTP) Live Streaming (HLS), Dynamic Adaptive Streaming over HTTP (DASH), or Adaptive Bitrate Streaming (ABS), although the requested content can be a segment of streaming video of another type. If the application management computing device 12 determines that the requested content is not a segment of streaming video, then the No branch is taken back to step 300 and another request for content is received. Optionally, the request is also processed by the application management computing device 12, such as by retrieving the content from one of the server devices 20(1)-20(n) or performing another action, for example.

However, if the application management computing device 12 determines in step 302 that the requested content is a segment of a streaming video, then the Yes branch is taken to step 304. In step 304, the application management computing device 12 retrieves the segment from one of the server devices 20(1)-20(n) and extracts a session identifier from an HTTP header of the response from the one of the server devices 20(1)-20(n) that includes the requested segment. In one example, the session identifier can be extracted from an HTTP header of the request received in step 300 and maintained by the application management computing device 12 until the HTTP response with the segment is retrieved. In another example, the requested content is a segment of live streaming video content of an HLS type and the session identifier is extracted from an X-PLAYBACK-SESSION-ID HTTP header, although the segment can be of another type of streaming video and the session identifier can be extracted from another HTTP header.

In step 306, the application management computing device 12 parses the retrieved segment to obtain static parameters associated with the segment, determines dynamic parameters associated with the streaming video content, and/or determines a segment QOE score for the segment, although other types and/or numbers of operations in other combinations could be performed. Optionally, other information may also be obtained in step 306, such as device capabilities of the requesting one of the client devices 14(1)-14(n) by way of example only. Also optionally, the additional information could be retrieved from a third party database using a user agent indicated in a header of the HTTP request or response, for example. In one example, the static parameters may include one or more of a nominal bit rate, a frame rate, a frame width, or a frame height, although other types and/or numbers of static parameters can also be obtained.

The dynamic parameters can include one or more of an actual bit rate, a freeze duration, or a freeze frequency, and can be generated based on an updating of previously stored information associated with segments of the video requested during the session, although other types and/or numbers of dynamic parameters can also be obtained as described and illustrated in more detail later.

The QOE score for the segment can be determined based on at least one or more of the static and/or dynamic parameters, which may optionally have a weighting factor applied, although the QOE score can be generated based on other types and/or numbers of parameters or other information. One exemplary method of determining a QOE score is disclosed in U.S. Provisional Patent Application Ser. No. 62/078,685, filed Nov. 12, 2014, which is hereby incorporated by reference in its entirety.

In step 308, the application management computing device 12 stores at least the static and/or dynamic parameters, segment QOE score, and an indication of the segment, in a record of the session database 32 associated with the session identifier extracted in step 304. Additionally, the application management computing device 12 can optionally determine whether a record associated with the session identifier already exists, which it can update. Alternatively, the application management computing device 12 can determine whether the segment is the first segment of the streaming video requested by the one of the client devices 14(1)-14(n) within the current session, in which case the application management computing device 12 can insert a new record associated with the session identifier into the session database 32.

Referring more specifically to FIG. 4, an exemplary session database 32 is illustrated. In this particular example, the session database 32 includes a record for each unique session identifier that is consistent across any number of connections via which segments of the streaming video are obtained by the one of the client devices 14(1)-14(n). Within each record of the session database 32 in this example, an indication of each of the requested segments is stored along with the associated obtained static parameters and generated dynamic parameters and segment QOE score, although other information can also be included in one or more of the records of the session database 32. Accordingly, by using the session database 32, the application management computing device 12 can determine the dynamic parameters for a segment in step 306 based on dynamic parameters or other stored information associated with one or more other segments of the streaming video previously requested and retrieved by the one of the client devices 14(1)-14(n).

Referring back to FIG. 3, in step 310, the application management computing device 12 sends the retrieved segment to the requesting one of the client devices 14(1)-14(n). In step 312, the application management computing device 12 determines whether the segment represents the end of the associated streaming video, such as by comparing a number of the segment with a previously retrieved playlist or manifest file, for example. If the application management computing device 12 determines that the end of the video has not been reached, then the No branch is taken to step 314.

In step 314, the application management computing device 12 determines whether a request for another segment of the video is received from the one of the client devices 14(1)-14(n). The additional request can be received via a different connection between the one of the client devices 14(1)-14(n) and the application management computing device 12 than the connection via which the request for the segment was received in step 300, although the connections can also be the same. If the application management computing device 12 determines that a request for another segment of the streaming video is received, then the Yes branch is taken back to step 304, and steps 304-314 may be repeated in a subsequent iteration.

However, if the application management computing device 12 determines in step 314 that a request for another segment of the video has not been received from the one of the client devices 14(1)-14(n), then the No branch is taken to optional step 316. In step 316, the application management computing device 12 determines whether a threshold time period has elapsed since the one of the client devices 14(1)-14(n) has requested a segment of the streaming video. The threshold time period can be established by an administrator of the application management computing device 12, for example. Exceeding the threshold in this example indicates that the user has stopped playing the video even though the end of the video has not been reached. Accordingly, in this example, the application management computing device 12 can maintain a time at which each segment of the streaming video is requested by the one of the client devices 14(1)-14(n), the last of which can be compared to a current time by the application management computing device 12 to determine whether the threshold time period has elapsed.

If the application management computing device 12 determines in step 316 that the threshold time period has not elapsed, then the No branch is taken back to step 314 and the application management computing device 12 essentially waits for a request for another segment of the streaming video to be received or the threshold time period to be exceeded. However, if the application management computing device 12 determines in step 316 that the threshold time period has elapsed, and the Yes branch is taken from step 316, or if the application management computing device 12 determines in step 312 that the end of the video has been reached and the Yes branch is taken from step 312, the application management computing device proceeds to step 318.

In step 318, the application management computing device 12 determines a video QOE score for the video based on each of the segment QOE scores determined in step 316, and stored in the record associated with the session identifier in step 308, and outputs the video QOE score, although other methods of determining the video QOE score can also be used. Optionally, the video QOE score can be output by the application management computing device 12 to a host or provider of the streaming video content to thereby provide the host with information regarding the quality of the service being experienced by the user of the one of the client devices 14(1)-14(n) with respect to the streaming video.

In step 320, the application management computing device 12 optionally removes the record associated with the session identifier from the session database 32. Accordingly, in this example, once the video QOE score is output, the record does not need to be maintained in the session database 32 and can be removed to make space available for additional records. Subsequent to removing the record, or in parallel with any of the steps illustrated in FIG. 3, the application management computing device 12 proceeds back to step 300 and receives another request for content from the one of the client devices 14(1)-14(n) or another of the client devices 14(1)-14(n).

Figure 5:
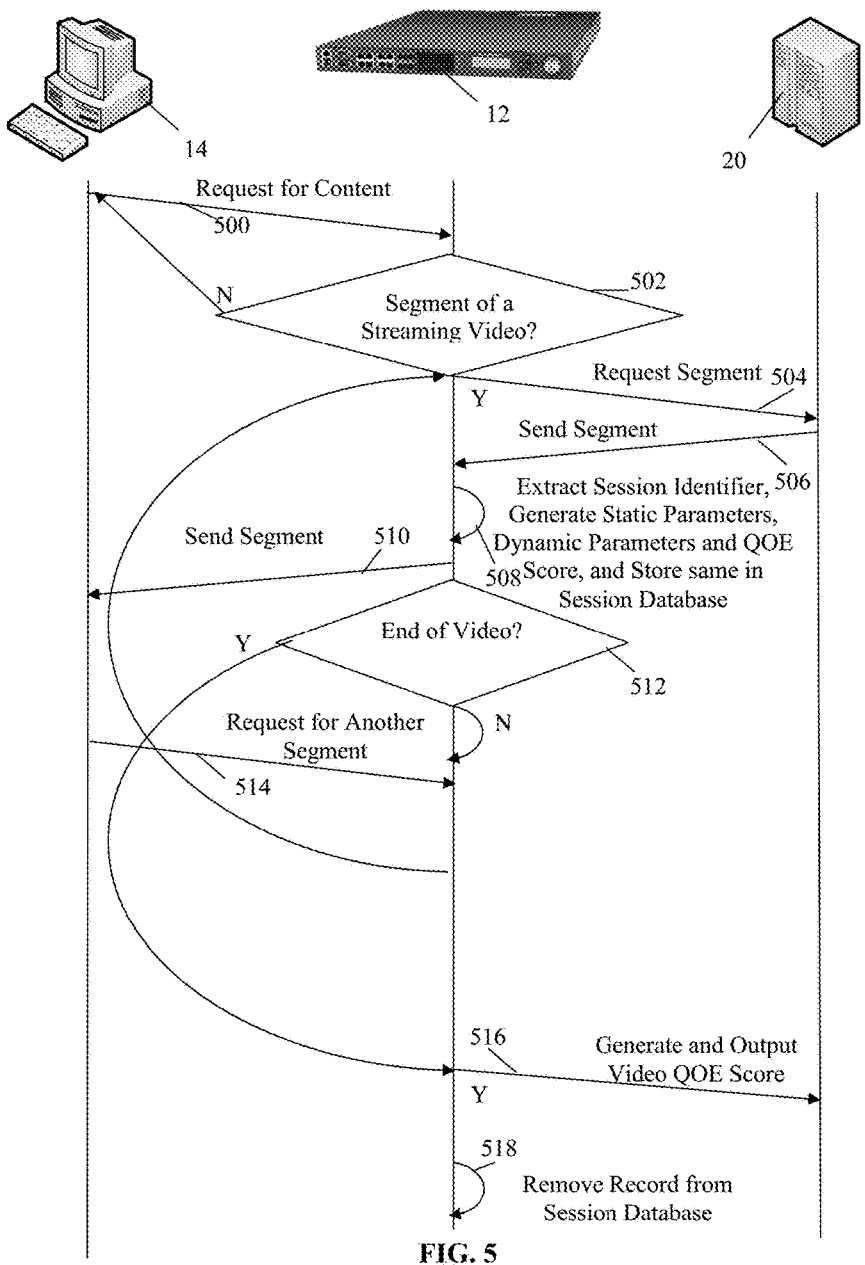
FIG. 5 is a timing diagram illustrating an exemplary method for analyzing a QOE for a streaming video across connections with a client device.

Referring more specifically to FIG. 5, an exemplary timing diagram of an exemplary method for analyzing QOE for a streaming video across connections with the client devices 14 is illustrated. In step 500 in this example, the client device 14 sends a request for content to the application management computing device 12. In step 502, the application management computing device 12 determines whether the requested content is a segment of a streaming video. If the application management computing device 12 determines that the requested content is not a segment of a streaming video, then the No branch is taken back to step 500 and the client device 14 sends another request for content.

However, if the application management computing device 12 determines in step 502 that the requested content is a segment of a streaming video, then the Yes branch is taken and, in step 504, the application management computing device 12 requests the segment from server device 20. In step 506, the server device 20 responds by sending the segment to the application management computing device 12.

In step 508, the application management computing device 12 extracts a session identifier from a header of the received response, generates one or more static parameters by parsing the payload or segment included in the response, generates one or more dynamic parameters for the segment, and generates a segment QOE score for the segment based on the static and dynamic parameters. Optionally, the session identifier can be extracted from a header included in the request received in step 500. Additionally, the application management computing device 12 stores the static and dynamic parameters, segment QOE score, and optionally an indication of the segment in a record of a session database 32 associated with the session identifier.

In step 510, the application management computing device 12 sends the requested segment to the client device 14. In step 512, the application management computing device 12 determines whether the end of the streaming video has been reached. If the application management computing device 12 determines that the end of the streaming video has not been reached, then the No branch is taken and the application management computing device 12 essentially waits for another request for another segment of the streaming video to be received. Upon receipt of another request in step 514, the application management computing device 12 proceeds back to step 504 and steps 504-512 are repeated.

However, if the application management computing device 12 determines in step 512 that the end of the video has been reached, then the Yes branch is taken to step 516. In step 516, the application management computing device 12 generates and outputs a video QOE score for the streaming video. The video QOE score can be generated based on the segment QOE scores for each of the segments, as previously determined and stored in the session database 32, as described and illustrated in more detail earlier. In step 518, the application management computing device 12 removes the record associated with the session identifier from the session database 32.

Accordingly, with this technology, a more effective QOE score can be generated for analyzing user experience with streaming video content without any user intervention. By using a session identifier and a session database, persistency can be maintained even though many connections may be utilized to obtain any number of segments of a streaming video. Accordingly, a segment QOE score can advantageously be determined using static and dynamic parameters for an increased number of segments for streaming video content, resulting in a more effective video QOE score and associated quality analysis of the streaming video content.

Having thus described the basic concept of this technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of this technology. Additionally, the recited order of processing elements or sequences, or the use of numbers, letters, or other designations therefore, is not intended to limit the claimed processes to any order except as may be specified in the claims. Accordingly, this technology is limited only by the following claims and equivalents thereto.

What is claimed is:

1. A method for improved quality of experience (QOE) analysis for streaming video content for which segments are transmitted across networks via different connections, the method implemented by a network traffic management system comprising one or more application management computing devices, server devices, or client devices and comprising:

obtaining a segment of streaming video content from a server in response to a request for the segment received from a client over one of a plurality of connections;

analyzing the segment of the streaming video content to determine one or more static or dynamic parameter values associated with the streaming video content;

generating a segment quality of experience (QOE) score for the segment of the streaming video content based on one or more of the determined static or dynamic parameter values;

extracting a session identifier for the one of the plurality of connections from the request or a response from the server that includes the segment of the streaming video content;

determining when another request for another segment of the streaming video content is received over the one of the plurality of connections based on the extracted session identifier, wherein the session identifier is associated with the one of the plurality of connections between the client and the server;

generating another segment QOE score for the another segment of the streaming video content when the determination indicates that the another request for the another segment of the streaming video content is received over the one of the plurality of connections;

generating a video QOE score for the streaming video content based on the segment QOE score and the another segment QOE score for the another segment of the streaming video content; and outputting the video QOE score.

2. The method as set forth in claim 1, further comprising:

determining when the received request is for streaming video content having a type comprising HyperText Transfer Protocol (HTTP) Live Streaming (HLS), Dynamic Adaptive Streaming over HTTP (DASH), or Adaptive Bitrate Streaming (ABS); and extracting the session identifier from an X-PLAYBACK-SESSION-ID header, when the determining indicates that the received request is for streaming video content of an HLS type.

3. The method as set forth in claim 1, wherein the received request is a HyperText Transfer Protocol (HTTP) request or the response is an HTTP response, the session identifier is extracted from a header of the received request or another header of the response, and the method further comprises:

receiving an additional request for an additional segment of the streaming video content via another one of the plurality of connections different from the one of the plurality of connections; and storing the determined static or dynamic parameter values, the generated segment QOE score, and an indication of the segment in a record of a session database associated with the session identifier.

4. The method as set forth in claim 3, further comprising:
determining when a threshold time period has elapsed subsequent to receiving the additional request for the additional segment of the streaming video content; and
generating the video QOE score and removing the record of the session database associated with the session identifier subsequent to generating the video QOE score, when the determining indicates that the threshold time period has elapsed.

5. The method as set forth in claim 3, further comprising:
determining when the segment of the streaming video content is a last segment of the streaming video content; and
generating the video QOE score when the determining indicates that the segment of the streaming video content is the last segment of the streaming video content.

6. A non-transitory computer readable medium having stored thereon instructions for improved quality of experience (QOE) analysis for streaming video content for which segments are transmitted from servers across networks via different connections with clients, comprising executable code, which when executed by one or more processors, causes the processors to:
obtain a segment of streaming video content from a server in response to a request for the segment received from a client over one of a plurality of connections;
analyze the segment of the streaming video content to determine one or more static or dynamic parameter values associated with the streaming video content;
generate a segment quality of experience (QOE) score for the segment of the streaming video content based on one or more of the determined static or dynamic parameter values;
extract a session identifier for the one of the plurality of connections from the request or a response from the server that includes the segment of the streaming video content;
determine when another request for another segment of the streaming video content is received over the one of the plurality of connections based on the extracted session identifier, wherein the session identifier is associated with the one of the plurality of connections between the client and the server;
generate another segment QOE score for the another segment of the streaming video content when the determination indicates that the another request for the another segment of the streaming video content is received over the one of the plurality of connections;
generate a video QOE score for the streaming video content based on the segment QOE score and the another segment QOE score for the another segment of the streaming video content; and
output the video QOE score.

7. The non-transitory computer readable medium as set forth in claim 6, wherein the executable code when executed by the processors further causes the processors to:
determine when the received request is for streaming video content having a type comprising HyperText Transfer Protocol (HTTP) Live Streaming (HLS), Dynamic Adaptive Streaming over HTTP (DASH), or Adaptive Bitrate Streaming (ABS); and
extract the session identifier from an X-PLAYBACK-SESSION-ID header, when the determining indicates that the received request is for streaming video content of an HLS type.

8. The non-transitory computer readable medium as set forth in claim 6, wherein the received request is a HyperText Transfer Protocol (HTTP) request or the response is an HTTP response, the session identifier is extracted from a header of the received request or another header of the response, and the executable code when executed by the processors further causes the processors to:
receive an additional request for an additional segment of the streaming video content via another one of the plurality of connections different from the one of the plurality of connections; and
store the determined static or dynamic parameter values, the generated segment QOE score, and an indication of the segment in a record of a session database associated with the session identifier.

9. The non-transitory computer readable medium as set forth in claim 8, wherein the executable code when executed by the processors further causes the processors to:
determine when a threshold time period has elapsed subsequent to receiving the additional request for the additional segment of the streaming video content; and
generate the video QOE score and remove the record of the session database associated with the session identifier subsequent to generating the video QOE score, when the determining indicates that the threshold time period has elapsed.

10. The non-transitory computer readable medium as set forth in claim 8, wherein the executable code when executed by the processors further causes the processors to:
determine when the segment of the streaming video content is a last segment of the streaming video content; and
generate the video QOE score when the determining indicates that the segment of the streaming video content is the last segment of the streaming video content.

11. An application management computing device, comprising a memory comprising programmed instructions stored thereon and at least one processor configured to be capable of executing the stored programmed instructions to:
obtain a segment of streaming video content from a server in response to a request for the segment received from a client over one of a plurality of connections;
analyze the segment of the streaming video content to determine one or more static or dynamic parameter values associated with the streaming video content;
generate a segment quality of experience (QOE) score for the segment of the streaming video content based on one or more of the determined static or dynamic parameter values;
extract a session identifier for the one of the plurality of connections from the request or a response from the server that includes the segment of the streaming video content;
determine when another request for another segment of the streaming video content is received over the one of the plurality of connections based on the extracted session identifier, wherein the session identifier is associated with the one of the plurality of connections between the client and the server;
generate another segment QOE score for the another segment of the streaming video content when the determination indicates that the another request for the another segment of the streaming video content is received over the one of the plurality of connections;
generate a video QOE score for the streaming video content based on the segment QOE score and the another segment QOE score for the another segment of the streaming video content; and
output the video QOE score.

12. The application management computing device as set forth in claim 11, wherein the processor is further configured to be capable of executing the stored programmed instructions to:
  determine when the received request is for streaming video content having a type comprising HyperText Transfer Protocol (HTTP) Live Streaming (HLS), Dynamic Adaptive Streaming over HTTP (DASH), or Adaptive Bitrate Streaming (ABS); and
  extract the session identifier from an X-PLAYBACK-SESSION-ID header, when the determining indicates that the received request is for streaming video content of an HLS type.

13. The application management computing device as set forth in claim 11, wherein the received request is a HyperText Transfer Protocol (HTTP) request or the response is an HTTP response, the session identifier is extracted from a header of the received request or another header of the response, and the processor is further configured to be capable of executing the stored programmed instructions to:
  receive an additional request for an additional segment of the streaming video content via another one of the plurality of connections different from the one of the plurality of connections; and
  store the determined static or dynamic parameter values, the generated segment QOE score, and an indication of the segment in a record of a session database associated with the session identifier.

14. The application management computing device as set forth in claim 13, wherein the processor is further configured to be capable of executing the stored programmed instructions to:
  determine when a threshold time period has elapsed subsequent to receiving the additional request for the additional segment of the streaming video content; and
  generate the video QOE score and remove the record of the session database associated with the session identifier subsequent to generating the video QOE score, when the determining indicates that the threshold time period has elapsed.

15. The application management computing device as set forth in claim 13, wherein the processor is further configured to be capable of executing the stored programmed instructions to:
  determine when the segment of the streaming video content is a last segment of the streaming video content; and
  generate the video QOE score when the determining indicates that the segment of the streaming video content is the last segment of the streaming video content.

16. A network traffic management system, comprising one or more application management computing devices, server devices, or client devices, the network traffic management system comprising memory comprising programmed instructions stored thereon and one or more processors configured to be capable of executing the stored programmed instructions to:
  obtain a segment of streaming video content from a server in response to a request for the segment received from a client over one of a plurality of connections;
  analyze the segment of the streaming video content to determine one or more static or dynamic parameter values associated with the streaming video content;
  generate a segment quality of experience (QOE) score for the segment of the streaming video content based on one or more of the static or dynamic parameter values;
  extract a session identifier for the one of the plurality of connections from the request or a response from the server that includes the segment of the streaming video content;
  determine when another request for another segment of the streaming video content is received over the one of the plurality of connections based on the extracted session identifier, wherein the session identifier is associated with the one of the plurality of connections between the client and the server;
  generate another segment QOE score for the another segment of the streaming video content when the determination indicates that the another request for the another segment of the streaming video content is received over the one of the plurality of connections;
  generate a video QOE score for the streaming video content based on the segment QOE score and the another segment QOE score for the another segment of the streaming video content; and
  output the video QOE score.

17. The network traffic management system of claim 16, wherein the one or more processors are further configured to be capable of executing the stored programmed instructions to:
  determine when the received request is for streaming video content having a type comprising HyperText Transfer Protocol (HTTP) Live Streaming (HLS), Dynamic Adaptive Streaming over HTTP (DASH), or Adaptive Bitrate Streaming (ABS); and
  extract the session identifier from an X-PLAYBACK-SESSION-ID header, when the determining indicates that the received request is for streaming video content of an HLS type.

18. The network traffic management system of claim 16, wherein the received request is a HyperText Transfer Protocol (HTTP) request or the response is an HTTP response, the session identifier is extracted from a header of the received request or another header of the response, and the one or more processors are further configured to be capable of executing the stored programmed instructions to:
  receive an additional request for an additional segment of the streaming video content via another one of the plurality of connections different from the one of the plurality of connections; and
  store the determined static or dynamic parameter values, the generated segment QOE score, and an indication of the segment in a record of a session database associated with the session identifier.

19. The network traffic management system of claim 18, wherein the one or more processors are further configured to be capable of executing the stored programmed instructions to:
  determine when a threshold time period has elapsed subsequent to receiving the additional request for the additional segment of the streaming video content; and
  generate the video QOE score and remove the record of the session database associated with the session identifier subsequent to generating the video QOE score, when the determining indicates that the threshold time period has elapsed.

20. The network traffic management system of claim 18, wherein the one or more processors are further configured to be capable of executing the stored programmed instructions to:

determine when the segment of the streaming video content is a last segment of the streaming video content; and generate the video QOE score when the determining indicates that the segment of the streaming video content is the last segment of the streaming video content.

* * * * *